(12) United States Patent
Martin et al.

(10) Patent No.: US 8,742,734 B2
(45) Date of Patent: Jun. 3, 2014

(54) ACTIVE FILTERING DEVICE FOR A POWER SUPPLY

(75) Inventors: Jean-Philippe Martin, Villers-lès-Nancy (FR); Serge Lionel Pierfederici, Velaine-en-Haye (FR); Bernard Davat, Nancy (FR); Farid Meibody-Tabar, Villers-les-Nancy (FR)

(73) Assignees: Centre National de la Recherche Scientifque, Paris (FR); Institut National Polytechnique de Lorraine, Vandoeuvre les Nancy (FR); Universite Henri Poincare, Nancy (FR)

( * ) Notice: Subject to any disclaimer, the term of this patent is extended or adjusted under 35 U.S.C. 154(b) by 773 days.

(21) Appl. No.: 12/530,698

(22) PCT Filed: Mar. 7, 2008

(86) PCT No.: PCT/FR2008/000299
§ 371 (c)(1),
(2), (4) Date: Jan. 26, 2010

(87) PCT Pub. No.: WO2008/132318
PCT Pub. Date: Nov. 6, 2008

(65) Prior Publication Data
US 2010/0148743 A1    Jun. 17, 2010

(30) Foreign Application Priority Data
Mar. 13, 2007    (FR) ..................... 07 01785

(51) Int. Cl.
*G05F 1/70*    (2006.01)
*H02M 1/12*    (2006.01)

(52) U.S. Cl.
USPC ............. 323/207; 323/210; 323/222; 363/17; 363/39

(58) Field of Classification Search
USPC ............ 323/205, 207, 222, 282, 210; 363/17, 363/39, 40, 44, 89
See application file for complete search history.

(56) References Cited

U.S. PATENT DOCUMENTS

| 5,565,761 A * | 10/1996 | Hwang .......................... 323/222 |
| 5,905,369 A * | 5/1999 | Ishii et al. ...................... 323/272 |
| 6,249,108 B1 * | 6/2001 | Smedley et al. .............. 323/207 |

(Continued)

FOREIGN PATENT DOCUMENTS

EP    0 951 133 A    10/1999

OTHER PUBLICATIONS

International Search Report from International Patent Application No. PCT/FR2008/000299, filed Mar. 7, 2008.

(Continued)

*Primary Examiner* — Adolf Berhane
*Assistant Examiner* — Fred E Finch, III
(74) *Attorney, Agent, or Firm* — Alston & Bird LLP

(57) ABSTRACT

The invention relates to an active filter device for a power supply comprising a source having a source of current $i_S$ and a voltage $V_E$, a power converter presenting an input inductor L, a power switch T controlled by a chopper signal and delivering an output voltage $V_S$, and a load, the device being characterized in that it includes an active filter converter (10) for generating at its output a compensation current minus harmonics of the source current due to the chopping, in response to an input signal representative of the chopping of the power converter.

11 Claims, 12 Drawing Sheets

(56) References Cited

U.S. PATENT DOCUMENTS

| | | | |
|---|---|---|---|
| 6,501,194 B1* | 12/2002 | Jiang et al. | 307/66 |
| 7,233,469 B2* | 6/2007 | Vinciarelli et al. | 361/78 |
| 7,274,579 B2* | 9/2007 | Ueda et al. | 363/125 |
| 2002/0190696 A1* | 12/2002 | Darshan | 323/207 |

OTHER PUBLICATIONS

Tripathi R K et al: "High power low distortion switch mode rectifier"; 32$^{nd}$ Annual IEEE Power Electronics Specialists Conference. PESC 2001. Conference Proceedings. Vancouver, Canada, June 17-21, 2001; Annual Power Electronics Specialists Conference, New York, NY; IEEE, US; vol. 1 of 4; Conf. 32; Jun. 17, 2001; pp. 701-706; XP010559311.

Ishii T et al: "Power factor correction using interleaving technique for critical mode switching converters"; Power Electronics Specialists Conference, 1998. PESC 98 Record. 29$^{th}$ Annual IEEE Fukuoka, Japan May 17-22, 1998, New York, NY, USA, IEEE, US; vol. 1; May 17, 1998; pp. 905-910, XP010294961.

Goran Stojcic et al: "A soft-switching bidrectional converter for the space station uninterruptible power supply"; Aerospace Power, Conversion Technology, Electromechanical Conversion. Atlanta, Aug. 8-13, 1993; Proceedings of the Intersociety Energy Conversion Engineering Conference (IECEC), New York, IEEE, US; vol. 1 Conf. 28; Aug. 8, 1993; pp. 1267-1272; XP000428311.

Yu-Kang Lo et al: "A new control method for single-phase active power line conditioners"; Applied Power Electronics Conference and Exposition, 1999. APEC '99. Fourteenth Annual Dallas, TX, USA; Mar. 14-18, 1999; Piscataway, NJ, USA, IEEEE, US, vol. 2, Mar. 14, 1999, pp. 1150-1152; XP010323594.

Chongming Qiao et al: "A comprehensive analysis and design of a single phase active power filter with unified constant-frequency integration control"; 32 Annual IEEE Power Electronics Specialists Conference. PESC 2001. Conference Proceedings. Vancouver, Canada; Jun. 17-21, 2001, Annual Power Electronics Specialists Conference, New York, NY: IEEE, US; vol. 1 of 4; Conf. 32; Jun. 17, 2001; pp. 1619-1625; XP010559460.

* cited by examiner

I filter current, $i_F$
II current $i_L$
III source current, $i_S$

ACTIVE FILTERING DEVICE FOR A POWER SUPPLY

CROSS REFERENCE TO RELATED APPLICATIONS

This application is a national stage application filed under 35 U.S.C. 371 of International Application No. PCT/FR2008/000299, filed Mar. 7, 2008, which claims priority from French Application No. 07/01785, filed Mar. 13, 2007.

FIELD AND BACKGROUND OF THE INVENTION

The present invention relates to an active filter device for a DC power supply comprising a source, a uni- or bi-directional power converter, and a load.

Known active filter devices compensate only the low-frequency current harmonics of the power supply network, and therefore they do not serve to eliminate the high-frequency current harmonics generated by the chopping of the power switches.

By way of example, such devices are described in the article by M. C. Benhabib and S. Saadate entitled "*New control approach for four-wire active power filter based on the use of synchronous reference frame*" published in Electric Power Systems Research, vol. 73, No. 3, pp. 353-362, (March 2005), or in the article by S. Saadate and S. H. Shahalami entitled "*Filtrage hybride des harmoniques engendrés par une charge fortement polluante—Application des algorithmes génétiques pour la boucle de contrôle*" [Hybrid filtering of harmonics generated by a highly-polluting load—Application of genetic algorithms for the control loop] published in Revue Internationale de Génie Electrique, vol. 6, No. 1-2, pp. 143-166 (April 2003).

A load converter is defined herein as a power structure that absorbs current continuously (examples: a buck chopper and variants thereof, a capacitive storage chopper and variants thereof, . . . ) possessing a finite number of operating sequences and capable of operating in unidirectional manner (current flowing from the source to the load, or in the opposite direction), or in bidirectional manner.

SUMMARY OF THE INVENTION

An object of the present invention is to filter the high-frequency harmonics of the current generated by the chopping of the power switches of the load converter, other than by a prior art solution implementing a passive filter.

The invention is based on the idea of controlling an active filter that generates a compensation current, on the basis of a chopper signal from the power converter.

The device operates regardless of the sign of the current and it may be used when the source supplies energy to the load and/or when the load supplies energy to the source (recovery sequence or battery charging, for example).

The invention thus provides an active filter device for a power supply comprising a source having a source current, a power converter presenting an input inductor L, a power switch T controlled by a chopper signal and delivering an output voltage $V_S$, and a load, the device being characterized in that it includes an active filter converter having an input for receiving a chopper signal from the power converter, for generating at its output a current for compensating harmonics of the source current due to the chopping, in response to an input signal representative of the chopping of the power converter.

The proposed device is an active filter device that is connected in parallel between an energy source and a load. By filtering the current harmonics absorbed by the load, the device serves to reduce the size of the input inductor L of the converter, or to reduce the operating frequency of the converter, to eliminate the passive filters dedicated to filtering these harmonics, and to increase the lifetime of the source.

The power supply may power a load from a source, or it may charge an energy source such as a battery from an active load, or indeed it may be bidirectional.

The filter device is advantageously characterized in that the active filter converter presents at least one filter module presenting in series from a first terminal of the filter converter: an inductor; first and second capacitors; and first and second switches that are controlled in opposition, which switches are connected respectively between first and second terminals of the second capacitor, and a second terminal of the filter converter; and also a DC-DC converter module controlled at a chopper frequency to maintain the voltages at the terminals of the first and second capacitors ($C_0$ and $C_1$) at their reference values.

Advantageously, the chopper frequency of the DC-DC converter module is greater than or equal to the frequency of the chopper signal of the power converter, and in particular is at least 10 times greater.

In a first variant, the DC-DC converter module presents two DC-DC converters.

In a first embodiment of this variant, the two DC-DC converters present a primary circuit having a bridge of power switches, a transformer, and a secondary circuit presenting a bridge of power switches, the power switches of said bridges being controlled in opposition in pairs.

In a second embodiment of this variant, the two DC-DC converters are non-reversible isolated choppers connected to the terminals respectively of the first and second capacitors, and a resistor is connected to the terminals of each of the first and second capacitors.

In a second variant, the DC-DC converter module presents a DC-DC converter with two outputs having a primary circuit presenting a bridge of power switches, a transformer having two secondaries, and two secondary circuits, each presenting a respective bridge of power switches, the switches of the bridges of power switches being controlled in opposition in pairs.

The power converter of the power supply may be of a type presenting at least two power conversion stages connected in parallel.

In a first configuration where said power conversion stages are controlled synchronously, the filter converter presents a single filter module.

In a second configuration where the power conversion stages are controlled in interlaced manner with a controlled time offset, e.g. of τ/n, where n designates the number of stages and τ designates the chopping period of the power converter, the active filter converter comprises a parallel connection, or preferably a series connection, of n active filter modules, each of which is controlled synchronously with a power conversion stage.

Finally, the invention provides a power supply comprising a source having a source of current $i_S$ and a voltage $V_E$, a power converter presenting an input inductor L, a power switch T, and delivering an output voltage $V_S$, the power supply being characterized in that it includes an active filter device as defined above connected in parallel between the input terminals (A, B) of the power converter.

BRIEF DESCRIPTION OF THE DRAWINGS

The invention can be better understood on reading the following inscription with reference to the drawings, in which.

MORE DETAILED DESCRIPTION

Figure 1:
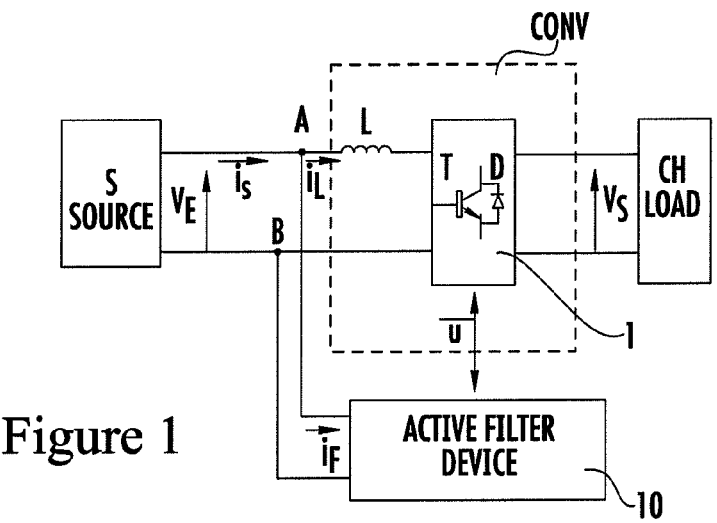
FIG. 1 is a block diagram of the present invention.

FIG. 1 is a diagram showing the invention. A power converter CONV is coupled via its input terminals A and B to a source S delivering a current $i_S$ and presenting an output voltage $V_E$. The converter CONV presents an input inductor L and a switching circuit 1 powering a load CH.

An active filter device 10 is connected in parallel to the terminals A and B, the filter device generating a compensation current $i_F$ that preferably has a mean value of zero and that compensates the variations in the current $i_L$ at least in part and preferably in full.

Figure 2:
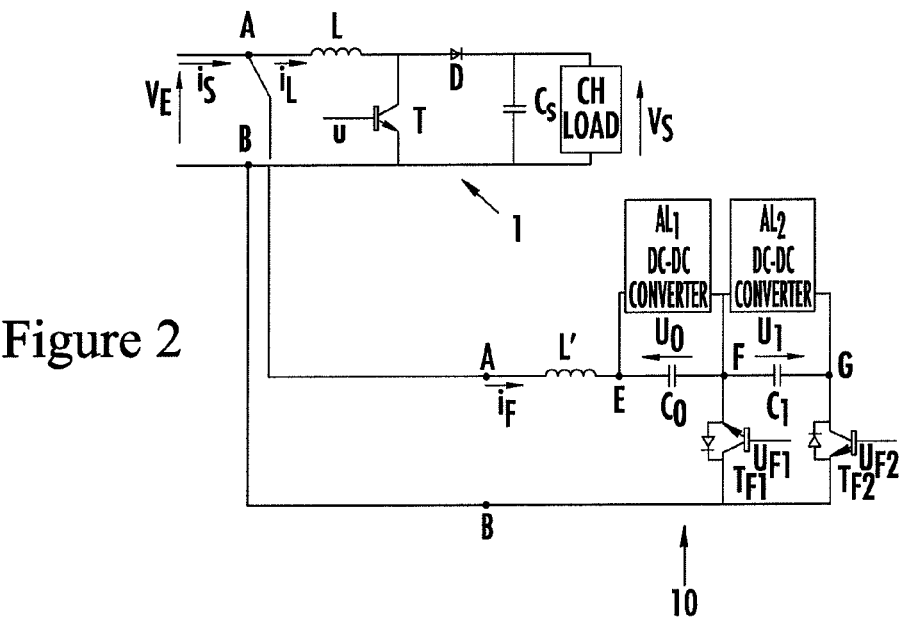
FIG. 2 shows a buck converter associated with a filter converter, FIG. 3 showing the waveforms of the currents as a function of time t.

By way of example, in FIG. 2 shows the invention embodied as a buck converter 1 that presents a power switch T controlled by a voltage u having a chopping period τ and delivering an output voltage $V_S$ at the anode of an output diode D having a capacitor $C_S$ connected thereto for filtering ripple from the output voltage of the converter.

The active filter device 10 connected to the terminals A and B has an input inductor L' and two capacitors in series $C_0$ and $C_1$, E designating the terminal common to L' and $C_0$, F designating the terminal common to $C_0$ and $C_1$, and G designating the free terminal of $C_1$. Two power switches $T_{F1}$ and $T_{F2}$ are connected between the terminal B and the terminals F and G respectively, and they are controlled by voltages $u_{F1}$ and $u_{F2}$ that are in opposition. The two switches $T_{F1}$ and $T_{F2}$ are represented by a transistor and a reverse-connected diode, and they are in opposition relative to each other.

Figure 4A:
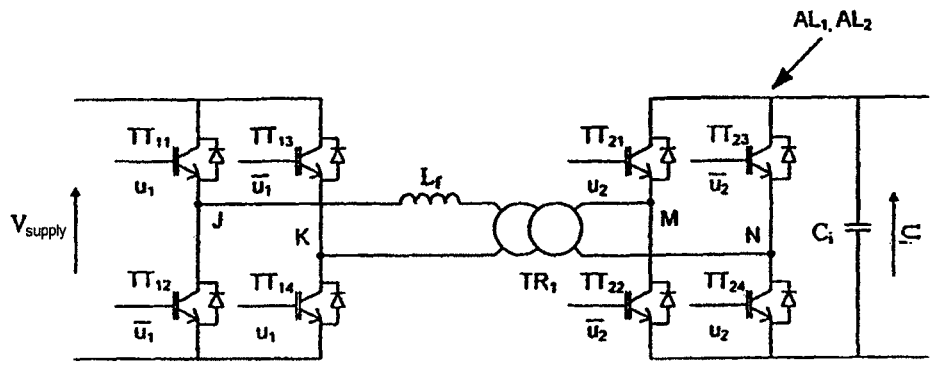
FIG. 4 shows examples of isolated reversible power supply converters respectively having two bridges (FIG. 4*a*) and three bridges (FIG. 4*b*)
Figure 4B:
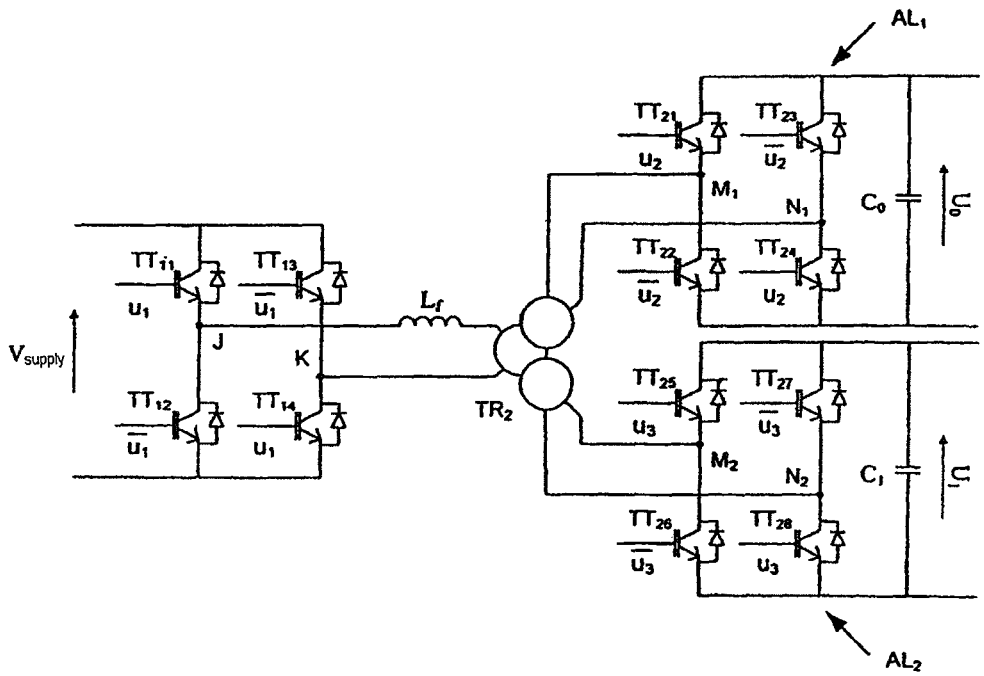

The voltages $U_0$ and $U_1$ at the terminals of $C_0$ and $C_1$ are regulated by an isolated DC-DC converter module having two stages $AL_1$ and $AL_2$, respectively imposing the voltages $U_0$ and $U_1$. The two stages $AL_1$ and $AL_2$ are independent (FIG. 4*a*) or else they form parts of a single module (FIG. 4*b*).

To reduce current ripple at the input of the converter, it is known to increase the chopping frequency of the switch and/or the inductance of the inductor L.

Figure 3:
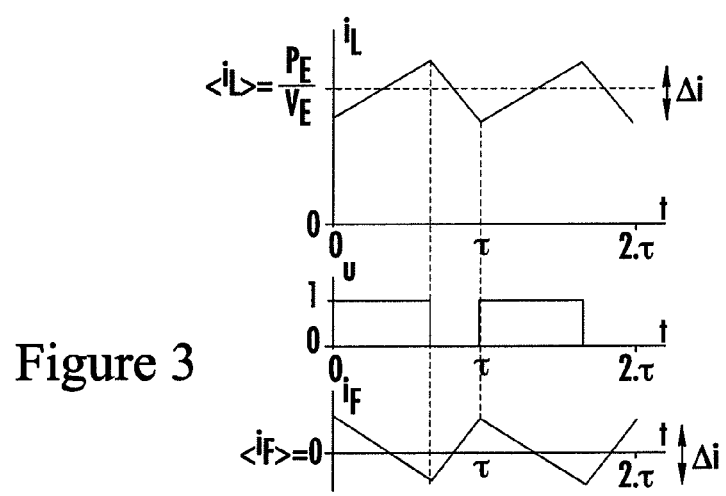

In the proposed solution, a filter device is thus connected in parallel, which device is a converter serving to absorb a current $i_F$ of zero mean value with ripple that is opposite to the ripple of the power converter. An example of waveforms obtained for a conventional buck converter (of the kind shown in FIG. 2) operating in continuous conduction mode is shown in FIG. 3, where $P_E$ is the power absorbed by the buck chopper of the power converter CONV, and τ designates the chopping period.

u represents the control signal applied to the controlled switch T of the converter CONV, with the chopping period τ, and that is used to control the switches of the active filter. The switch may be controlled by any signal representative of the chopping of the converter CONV, i.e. any signal that is synchronous with the signal u.

When u=1, the switch conducts and the voltage applied to the terminals of the inductor L is the power supply voltage $V_E$ delivered by the source S. When the switch is off (u=0), this voltage becomes equal to $V_E-V_S$, where $V_S$ is the output voltage from the buck chopper that is delivered to the load CH. To fully compensate the variations in the current $i_L$, it is necessary for the filter converter to absorb a current of slope $$-\frac{V_E}{L}$$

when u=1, and of slope $$-\frac{V_E - V_S}{L}$$

when u=0.

In order to satisfy these two constraints, the active filter 10 (FIG. 2) is connected in parallel to the terminals A and B. The input inductor L' conveys the compensation current $i_F$. The two controlled switches $T_{F1}$ and $T_{F2}$ are controlled by the voltages $u_{F1}$ and $u_{F2}$.

The control signals $u_{F1}$ and $u_{F2}$ are complementary. The presence of a certain amount of dead time is necessary in order to avoid short-circuiting the capacitor $C_1$, and this time has no influence on the performance of the filtering.

In a buck converter, in order to satisfy the above-mentioned conditions concerning slopes, i.e. in order to achieve exact compensation, the voltages $U_0$ and $U_1$ are defined by the following relationships:

$$U_0 = \frac{L+L'}{L} \cdot V_E \qquad (1)$$

$$U_1 = \frac{L'}{L} \cdot V_S$$

It is possible to use two inductors L and L' having different inductances so as to reduce the voltage levels across the terminals of the capacitors $C_0$ and $C_1$. This property makes it possible to envisage using low-voltage components in the structure of the active filter, and also an inductor L' of small inductance. It is then easy to reduce the volume of the active filter and to improve the efficiency of the device.

Since the mean current conveyed by the inductor L' is zero, its size, its weight, and its cost are small in comparison with the inductor L of the switching circuit 1 of the power converter CONV. Similarly, the power switches $T_{F1}$ and $T_{F2}$ have a maximum switched current equal to $$\frac{\Delta i}{2},$$

where $\Delta i$ designates the peak-to-peak amplitude of the current $i_L$ conveyed by the inductor L.

To control the voltages $U_0$ and $U_1$, the two capacitors $C_0$ and $C_1$ are connected to the isolated DC-DC converters $AL_1$ and $AL_2$. These converters may be of reversible or non-reversible nature. The choice of one structure rather than another is determined by the levels of loss that can be accepted in the active filter. To minimize losses in on the structure of the active filter, the capacitors $C_0$ and $C_1$ must not supply any energy, in the sense of mean values. It is then necessary to use a reversible isolated chopper to control the voltages $U_0$ and $U_1$. FIG. 4 gives two examples of converters for adjusting the voltages $U_0$ and $U_1$. For the first example (FIG. 4a), two identical converters are necessary (one for each capacitor $C_0$ and $C_1$). For the second example (FIG. 4b), a transformer $TR_2$ having two secondary windings makes it possible to use only one converter with the primary. The voltage $V_{supply}$ is an arbitrary DC voltage available in the device (auxiliary battery, or other), and in particular it may be the voltage $V_S$ at the output from the converter CONV.

In FIG. 4a, the DC-DC converter presents four switches $TT_{11}$ to $TT_{14}$ at the primary that are connected as a bridge and that are powered in pairs by two voltages in opposition $u_1$ and $\overline{u_1}$. The bridge has a first branch with the switches $TT_{11}$ and $TT_{12}$ controlled by $u_1$ and $\overline{u_1}$, and a second branch comprising the switches $TT_{13}$ and $TT_{14}$ controlled by $\overline{u_1}$ and $u_1$. These branches are powered by a DC voltage $V_{supply}$ (e.g. $V_S$).

The midpoints J and K of these two branches are connected to the primary of a transformer $TR_1$, having its secondary connected to the midpoints M and N of a bridge having four switches $TT_{21}$ to $TT_{24}$ connected as a bridge in a manner similar to the switches $TT_{11}$ to $TT_{14}$, and they are powered in pairs by two voltages in opposition $u_2$ and $\overline{u_2}$. A capacitor $C_i$ is connected to the output of the bridge in a configuration that delivers a voltage $U_i$ (with i=0 or 1, cf FIG. 2).

The circuit of FIG. 4b is similar, except that the transformer $TR_2$ has two secondaries and controls two four-switch bridges via their midpoints $M_1$, $N_1$ and $M_2$, $N_2$ with voltages $u_2$ & $\overline{u_2}$, and $u_3$ & $\overline{u_3}$ in order to deliver the voltages $U_0$ and $U_1$.

Figure 5:
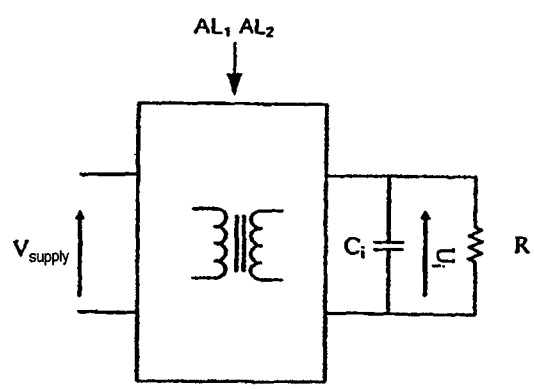
FIG. 5 shows voltage adaptation with the help of a resistor.

When minimizing losses in the active filter is not a priority objective, it is possible to simplify the structure by using nonreversible isolated choppers as described for example in the work by J-P. Ferrieux, F. Forest entitled "*Alimentation à découpage, convertisseurs à resonance: principes—composants—modélisation*" [Chopper power supplies, resonant converters: principles—components—modeling] second edition, published by Masson, Paris, 1997, and in particular page 56 ("Flyback"), page 62 ("Forward"), and page 70 ("Push-pull" circuit). It is then necessary to add resistors across the terminals of each of the capacitors $C_0$ and $C_1$. When the voltage $U_0$ or $U_1$ needs to be reduced in order to satisfy equation (1), the resistor R in parallel with the competitor serves to adapt the voltage (FIG. 5), at the cost of Joule losses.

The output voltages $U_0$ and $U_1$ (FIG. 2) are servo controlled in conventional manner. The chopping frequency of the power switches used in the isolated power supplies may be high since, under steady conditions, the power delivered by the capacitors $C_i$ is practically zero (reversible isolated power supply), or is low (non-reversible isolated power supply). These properties make it possible to guarantee high-quality dynamic servo control properties. The voltage $U_i$ is therefore capable of quickly tracking variation in its reference voltage. The active filter can therefore compensate the high-frequency component of the current, even while transient conditions are affecting the power device.

In order to guarantee that the power consumed by the active filter is at a minimum, it is necessary to guarantee that the mean value of the absorbed current is zero. Canceling the HF component requires synchronization between the control signals of the active filter and the control signals of the power converter. By way of example, these two constraints can be resolved by using hybrid current regulators, e.g. as described in the following documents:

J. P. Martin, S. Pierfederici, F. Meibody-Tabar, B. Davat, *New Fixed Frequency AC Current Controller for a Single Phase Voltage Inverter*, IEEE Power Electronics Specialists Conference (PESC'02), Jun. 23-27, 2002, Cairns (Australia), vol. 2, pp. 909-914;

S. Pierfederici, J. P. Martin, F. Meibody-Tabar, B. Davat, *Robust Fixed Frequency Control for Parallel Connected Forward/Buck converters*, European Physical Journal Applied Physics, 2003, 24, pp. 121-138; and A. Lachichi, S. Pierfederici, J.-P. Martin, B. Davat, *A Hybrid Fixed Frequency Controller Suitable for Fuel Cell Applications*, IEEE Power Electronics Specialists Conference (PESC'05), June 12-15, Recife (Brazil).

Figure 6:
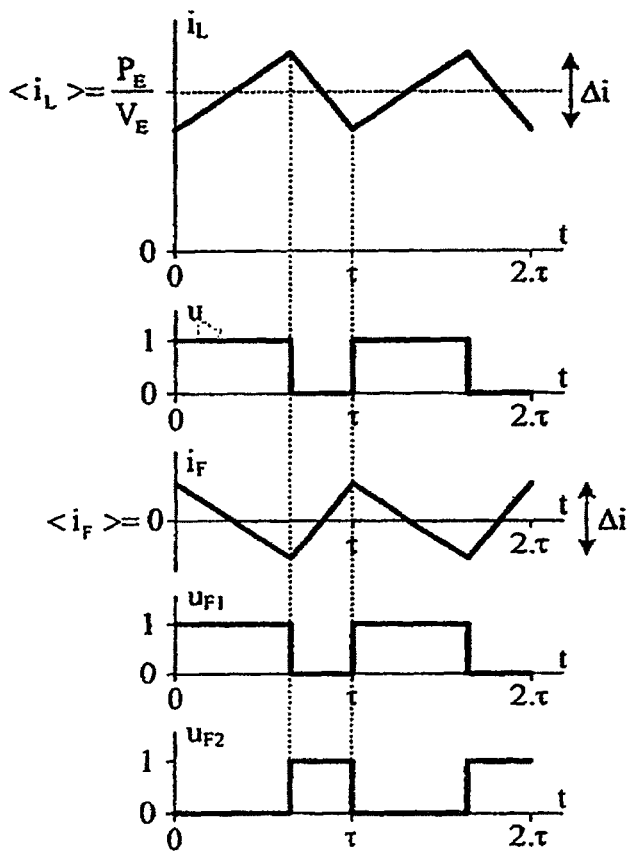
FIG. 6 is a timing diagram showing the signals of the FIG. 2 converter (with $i_L>0$)

Synchronization is achieved by switch on or off orders issued for controlling the main converter. An example of waveforms obtained by using switch-on synchronization is shown in FIG. 6 ($i_L$>0). On detecting a falling front in u, a switch-on order $u_{F2}$ is generated for the switch $T_{F2}$. The switch-off order for this switch may be given by the output from the current regulator of the active filter that controls the mean value of the current to be zero.

EXAMPLE (SIMULATION)

The buck chopper is controlled in current mode. Its output voltage is servo controlled to 180 volts (V), the input voltage is set at 55 V, and the load power is set at 16.2 kilowatts (kW).

Figure 7:
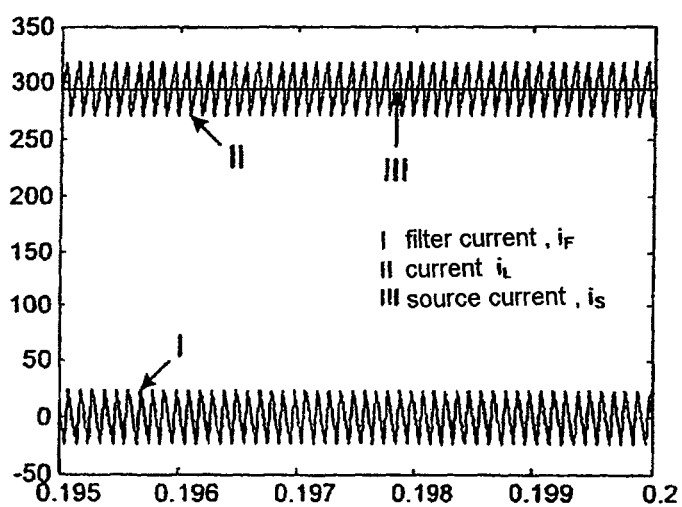
FIG. 7 is a timing diagram of various currents.
Figure 8:
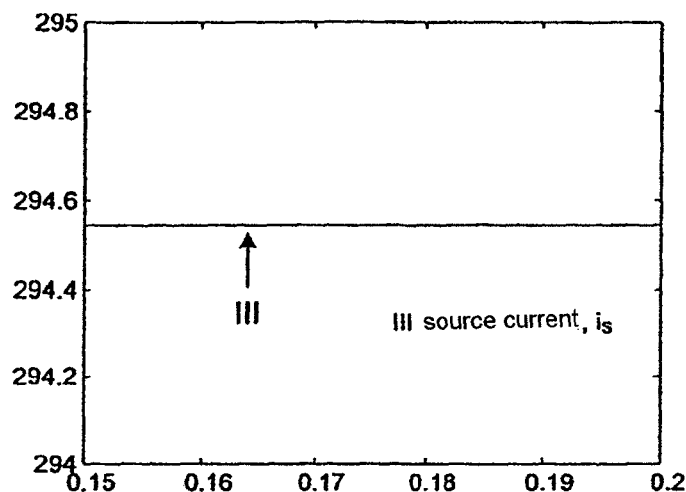
FIG. 8 showing the amplified appearance of the current $i_S$ delivered by the source, and FIGS. 9*a* and 9*b* showing the behavior of the currents under transient conditions.

The inductor L of the power converter and the inductor L' of the active filter have identical inductances equal to 77 microhenries (μH). The reversible isolated structure shown in FIG. 4a is used to control the voltages $U_0$ and $U_1$. Initially, the power switches are assumed to be perfect, and resistive losses in the various elements of the circuit (chopper and active filter) are assumed to be negligible. The voltages across the terminals of the capacitors $C_0$ and $C_1$ are assumed to be perfectly controlled and, at all instants, to be equal to their reference values. The various currents, i.e. the filter current $i_F$, the current $i_L$ of the load converter, and the current $i_S$ delivered by the source, are shown in FIG. 7. With these assumptions, the current $i_S$ provided by the source ($i_S=i_L+iF$) is perfectly constant (FIG. 8).

Figure 9A:
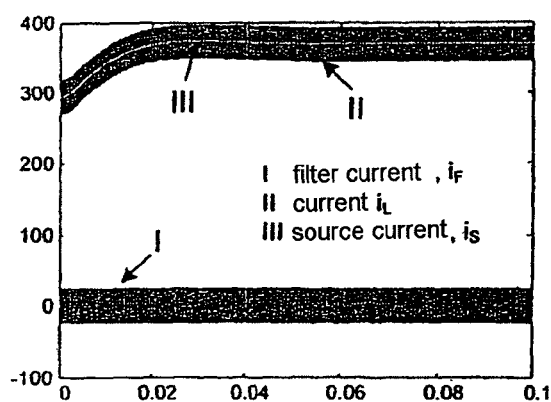
Figure 9B:
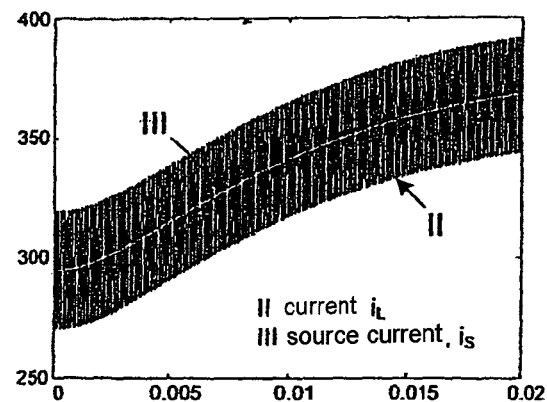

During a voltage step on the load CH, as shown in FIG. 9a and in the enlargement of the transient zone in FIG. 9b, the active filter compensates the current ripple absorbed by the buck chopper, even under transient conditions. The source current $i_S$ thus tracks the voltage step on the load CH without forwarding the current ripple due to the buck chopper CONV.

The device of the invention also operates when a converter powers the source, or with a bidirectional converter.

Figure 10A:
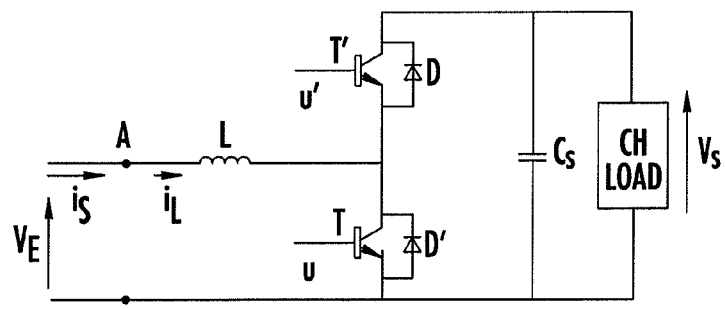
FIG. 10 shows examples of a bidirectional current converter (FIG. 10*a*) and of a converter for charging a battery (FIG. 10*b*)
Figure 10B:
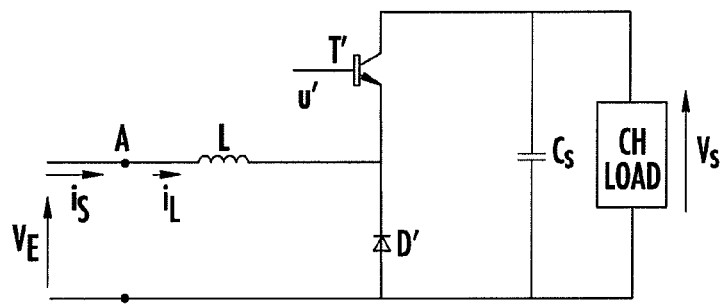
Figure 11:
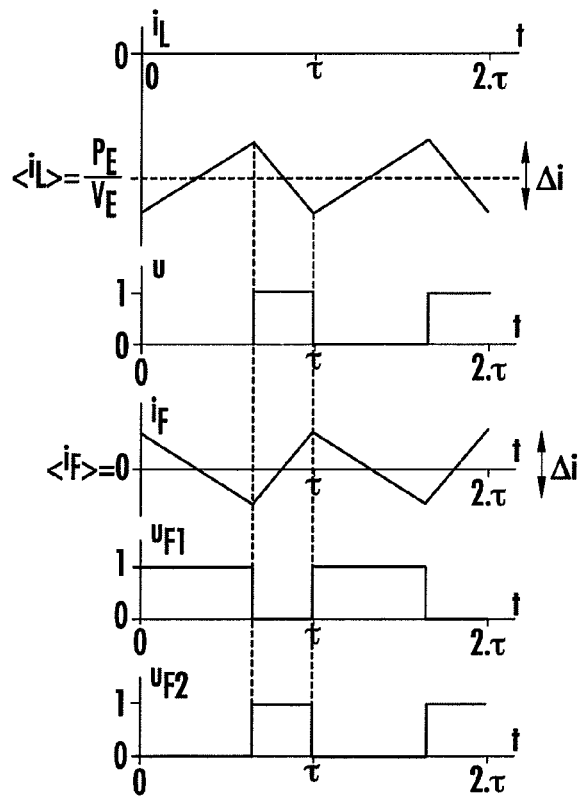
FIG. 11 is a timing diagram of the converter signals for $i_L<0$.

For converters that present recovery sequences (bidirectional converter of FIG. 10a), or for converters that are dedicated to recharging batteries (FIG. 10b), the principle remains unchanged, the schematic of the active filter remains the same, and the waveforms are the same as in FIG. 6, the current $i_L$ in the inductor L' now being negative (FIG. 11).

Compared with a converter shown in FIG. 2, a bidirectional converter shown by way of example in FIG. 10a presents an additional switch T' associated with a diode D' connected in reverse across the switch T, the load CH (acting as a source during recovery sequences) being connected between the switches T and T' in series. The switch T is controlled so that $i_L>0$, while the switch T' is controlled so that $i_L<0$.

FIG. 10b shows a unidirectional converter for $i_L<0$. It has only the controlled switch T' and the diode D'. Under such circumstances, the load CH acts as the source during charging, e.g. battery charging.

For dimensioning the capacitors $C_i$ of the active filter, the following simplifying assumptions are made:
the chopping frequency of the power supplies isolated from the active filter is much greater than the frequencies of the current harmonics that are to be filtered (e.g. at least 10 times greater); and
the capacitors are dimensioned for the worst possible circumstances. The current $i_F$ is assumed to pass through all of the capacitors $C_i$. This assumption is true for the capacitor $C_0$, and it leads to the other capacitors being over-dimensioned.

When calculating the high frequency voltage ripple of the capacitors $C_i$ (due to the chopping), the first assumption makes it possible to ignore the high-frequency components of the currents delivered by the isolated power supplies. The second assumption makes it possible to calculate the voltage ripple at the terminals of the capacitors $C_i$ in analytic manner. When the power device corresponds to that shown in FIG. 2, this expression is written as follows:

$$C_i \geq \frac{d \cdot (1-d) \cdot V_E}{8 \cdot L' \cdot f^2 \cdot \Delta U_i} \quad (2)$$

where d is the duty ratio, f is the chopping frequency of the converter CONV, and $\Delta U_i$ is the amount of voltage ripple due to the chopping that can be tolerated. This voltage ripple should be selected in such a manner as to be negligible compared with the mean voltage value. By way of example, using the following parameters: $V_E=55$ V, $V_S=180$ V, and $L=L'=77$ μH, a ripple of 1% of the voltage $U_1$ leads to a value for $C_i \geq 170$ μF.

Note:
the dimensioning of the capacitors $C_i$ is independent of the level of current flowing in the power converter. It depends only on the voltages involved in the power structure.

Figure 12A:
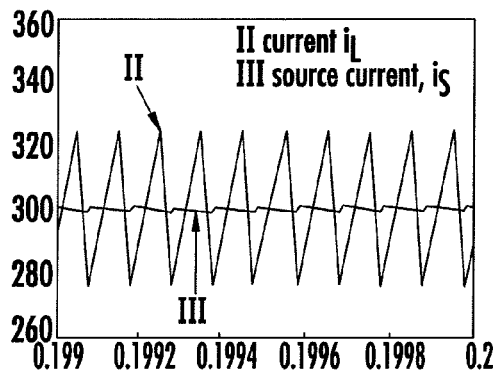
FIGS. 12*a* & 12*b*, and 13*a* & 13*b* show the various currents taking account of the residences of the inductors and with modification of the references for the voltages $U_0$ and $U_1$ in FIGS. 13*a* & 13*b*.
Figure 12B:
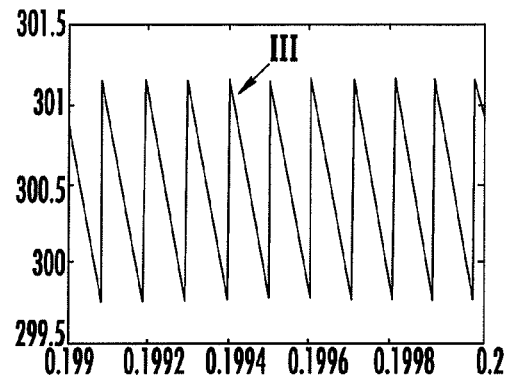

In the following tests, the simulations take account of resistive losses in the inductive elements. This time, the current source $i_S$ presents a small amount of ripple (FIG. 12, curve III).

Figure 13A:
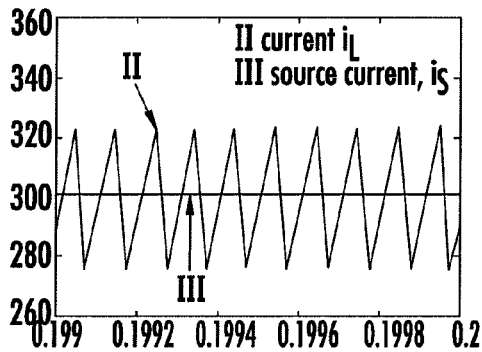
Figure 13B:
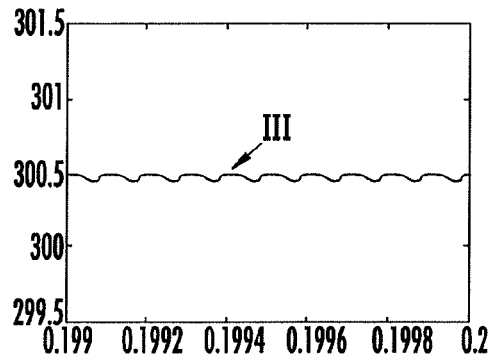

It is possible to take account of the voltage drops due to the resistive elements by using equation (3) below to modify the voltage references imposed on the terminals of the capacitors $C_0$ and $C_1$. FIG. 13 shows the results obtained with the strategy whereby the voltages $U_0$ and $U_1$ are modified in accordance with equation (3) below, but in a simplified manner that does not take account of the voltage drops $V_K$, $V_{F1}$, and $V_{F2}$ at the terminals of the semiconductors. The current ripple delivered by the source is once more very low.

It is preferable to take account of the voltage drops at the terminals of the semiconductors. Furthermore, the parameters needed for good operation of the filter (in particular the series resistance $R_L$ of the inductor L) can be estimated by in-line identification of the parameters that would make it possible to ensure ideal operation, even in the presence of varying parameters (e.g. variations of the resistances as a function of temperature).

Figure 14:
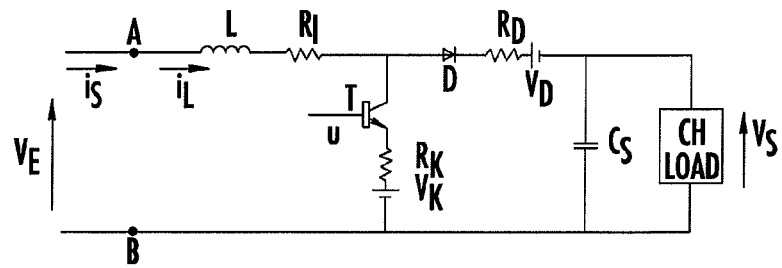
FIG. 14 shows the circuit comprising the booster chopper and the active filter, with parasitic elements taken into account.
Figure 14:
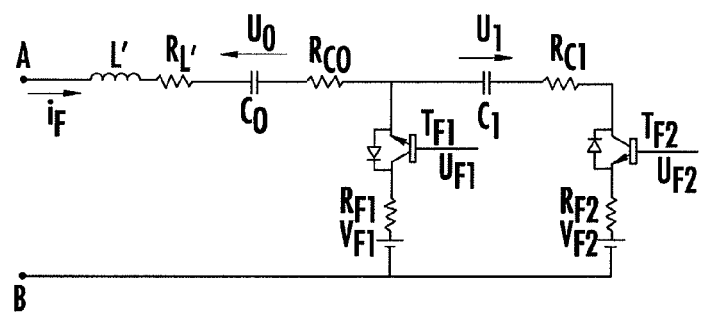

If account is taken of all of the interfering elements (series resistance $R_D$ and forward voltage drop of the diode D, resistances $R_L$ and $R_{L'}$ of the inductors, series resistances $R_{C0}$ and $R_{C1}$ of $C_0$ and $C_1$, resistances $R_K$, $R_{F1}$, and $R_{F2}$, and voltage drops $V_K$, $V_{F1}$, and $V_{F2}$ of the semiconductors constituting the switches when they are conducting, etc.), then the equivalent circuit of FIG. 14 is obtained for the buck converter under consideration.

Under such circumstances, the reference voltages become:

$$U_0 = \left(1 + \frac{L'}{L}\right) \cdot V_E - \frac{L'}{L} \cdot (R_L + R_K) \cdot i_L - \quad (3)$$
$$\frac{L'}{L} \cdot V_K - (R_{C0} + R_{F1} + R_{L'}) \cdot i_F - V_{F1}$$
$$U_1 = (V_D + V_S) \cdot \frac{L'}{L} + (R_D - R_K) \cdot \frac{L'}{L} \cdot i_L - \frac{L'}{L} \cdot V_K +$$
$$(R_{C1} + R_{F2} - R_{F1}) \cdot i_F + V_{F2} - V_{F1}$$

As mentioned above, it is also possible to perform compensation that is partial only, in particular by ignoring the voltage drops $V_K$, $V_{F1}$, and $V_{F2}$.

The device for filtering the current harmonics due to the chopping operates with a mean current of zero if it is desired to minimize losses. When the current consumed by the user contains both low-frequency harmonics (due to the load) and high-frequency harmonics (due to the chopping), it is possible to envisage minimizing the low-frequency harmonics and canceling the high-frequency harmonics as follows.

It is assumed that the current $i_L=$(FIG. 14) is written in the following form:

$$i_L(t) = i_{L0} + i_{L,lf}(t) + i_{L,hf}(t)$$

where $i_{L0}$, $i_{L,lf}$, and $i_{L,hf}$ represent respectively in the DC, low-frequency, and high-frequency components of the current consumed by the load converter (see FIG. 1).

Controlling the current $i_f$ absorbed by the filter device (FIG. 1) ensures that this current has the form:

$$i_f(t) = +i_{f,lf}(t) + i_{f,hf}(t)$$

with $i_{f,lf}(t) = -i_{L,lf}(t)$ and $i_{f,hf}(t) = -i_{L,hf}(t)$, where:
- $i_{f,hf}(t)$ represents the high-frequency ripple due to the chopping (ignoring sign). It is generated automatically as described above; and
- $i_{f,lf}(t)$ represents the low-frequency component of the current to be generated by the filter device in order to compensate the low-frequency harmonics generated by the user. It is obtained by using conventional low-frequency harmonic filtering methods based on power balances, thus making it possible to generate a component for compensating the low-frequency harmonics.

It has been known for a long time that converters may be connected in parallel in order to increase the current that is absorbed by the load converter. Identical converters are connected in parallel at the output from the energy source and they power the same load, each converter conveying only $1/n^{th}$ of the total current.

Figure 15:
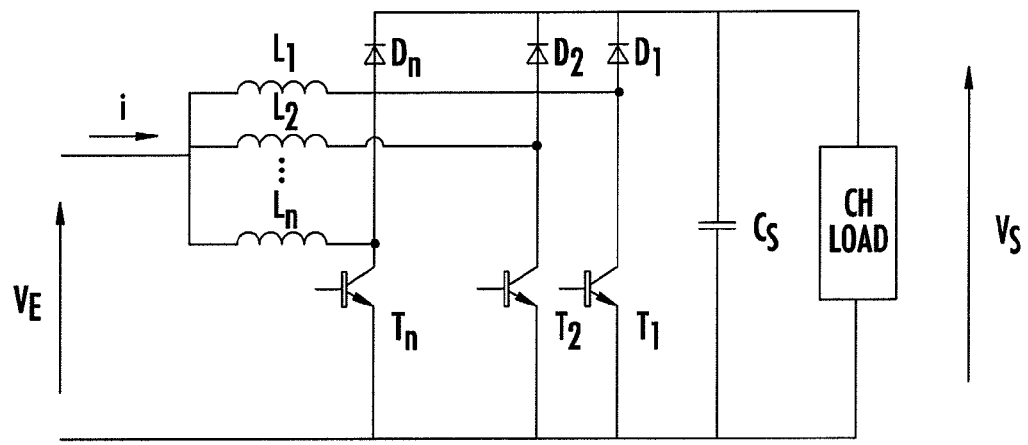
FIG. 15 shows a so-called interlaced structure having n input stages, FIG. 16 being a timing diagram of the signals for an interlaced structure having n=2 stages with synchronous control of the switches.

FIG. 15 shows an example of a parallel structure having n stages. It comprises n parallel branches, each having a respective inductor $L_1, L_2, \ldots,$ and $L_n$ and a respective controlled switch $T_1, T_2, \ldots,$ and $T_n$. The various branches are connected to the load via respective diodes $D_1, D_2, \ldots,$ and $D_n$. In this type of structure, control may be synchronous (all of the power switches being switched on and off simultaneously), or interlaced (the control signals are offset in time by $\tau/n$, when n is the number of branches in parallel and $\tau$ is the chopping period). The interleaving technique serves to reduce the current ripple absorbed by the DC source. By reducing current ripple, this method makes it possible to reduce the size and the weight of the input filters. It is possible to use different offsets between the control signals to the various branches, but that leads to poorer performance in the absence of the proposed filter device.

Figure 16:
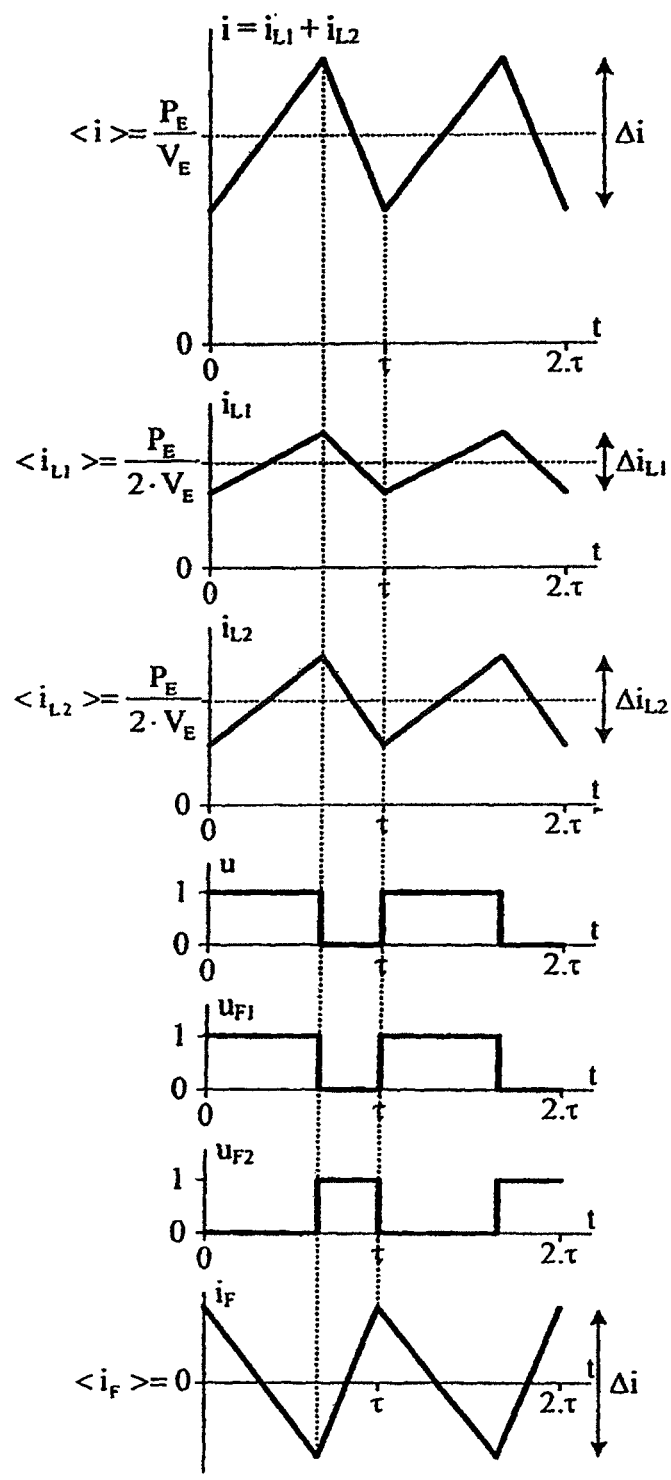

When the switches are controlled synchronously, it is the same control signal u that controls the parallel-connected converters. The filter converter 10 shown in FIG. 2 serves to cancel the high-frequency current ripple. The only changes are the amplitudes of the currents conveyed by the filter inductor L' and the values of the voltages in the active filter (FIG. 16).

The parallel-connected converters may have different inductances (deliberately or for construction purposes), and the equations defining the voltages $U_0$ and $U_1$ become:

$$U_0 = \left(1 + L' \cdot \sum_{k=1}^{n} \frac{1}{L_k}\right) \cdot V_E \quad (4)$$

$$U_1 = L' \cdot \left(\sum_{k=1}^{n} \frac{1}{L_k}\right) \cdot V_S$$

When interlaced control of the switches is used, the peak current conveyed by the inductor L is smaller. Under such circumstances, the simplest filtering method consists in using one active filter per branch, each filtering the current of one of the parallel-connected converters, thereby leading to n active filters being connected in parallel.

Figure 17A:
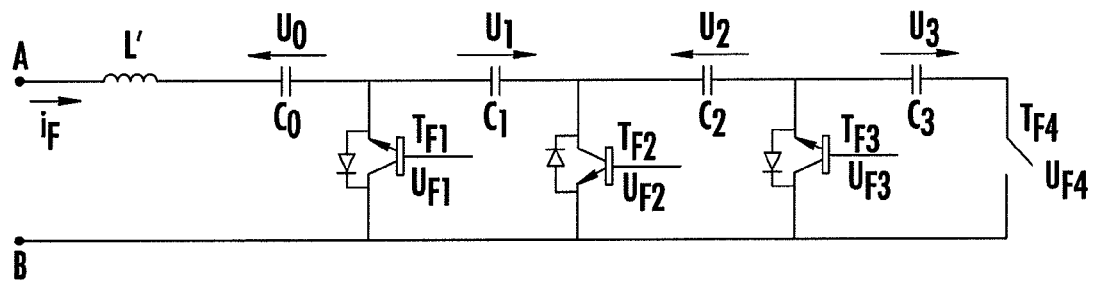
FIG. 17*a* shows an active filter structure for n=2 and embodiments of one of the switches of the filter (FIG. 17*b*), FIGS. 18*a* and 18*b* being timing diagrams of the signals and the filter control for a duty ratio d less than 0.5, with $L_2<L_1$ and $d<L_2/(L_1+L_2)$ and $d>L_2/(L_1+L_2)$ respectively in FIG. 18*a* and in FIG. 18*b*, where
Figure 17B:
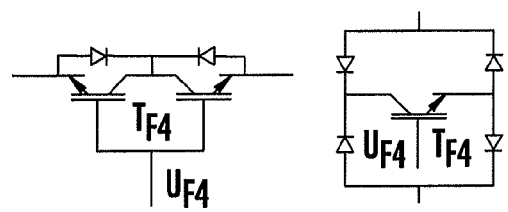

For a small number of branches, it is also possible to use only one filter by increasing the number of capacitors. By way of example, for a two-stage interlaced chopper (n=2), FIG. 17 shows the structure of the active filter. It has four capacitors $C_0, C_1, C_2,$ and $C_3$ connected in series, having the following voltages $U_0, U_1, U_2,$ and $U_3$ at their terminals, together with four switches $T_{F1}, T_{F2}, T_{F3},$ and $T_{F4}$ that are controlled by the voltages $u_{F1}, u_{F2}, u_{F3},$ and $u_{F4}$. Unlike the other three switches, the switch $T_{F4}$ is bidirectional in voltage and in current, and by way of example it may be wired in accordance with one of the circuits of FIG. 17b.

If the inductances $L_1$ and $L_2$ are different, then and there are four ranges in which the slopes of the total current i are different, and it is now necessary to have four voltages $U_0, U_1, U_2,$ and $U_3$. As above, the voltages $U_0, U_1, U_2,$ and $U_3$ are regulated to pre-calculated reference values with the help of optionally reversible isolated power supplies, which values are given as follows:

$$U_0 = \left(1 + L' \cdot \left(\frac{1}{L_1} + \frac{1}{L_2}\right)\right) \cdot V_E \quad (5)$$

$$U_1 = L' \cdot \left(\frac{1}{L_1} + \frac{1}{L_2}\right) \cdot V_S$$

$$U_2 = \frac{L'}{L_2} \cdot V_S$$

$$U_3 = L' \cdot \left(\frac{1}{L_2} - \frac{1}{L_1}\right) \cdot V_S$$

These voltages are all positive if it is assumed that $L_2 < L_1$ (otherwise it suffices to interchange the indices for the voltages $U_2$ and $U_3$).

Figures 18A, 18B:
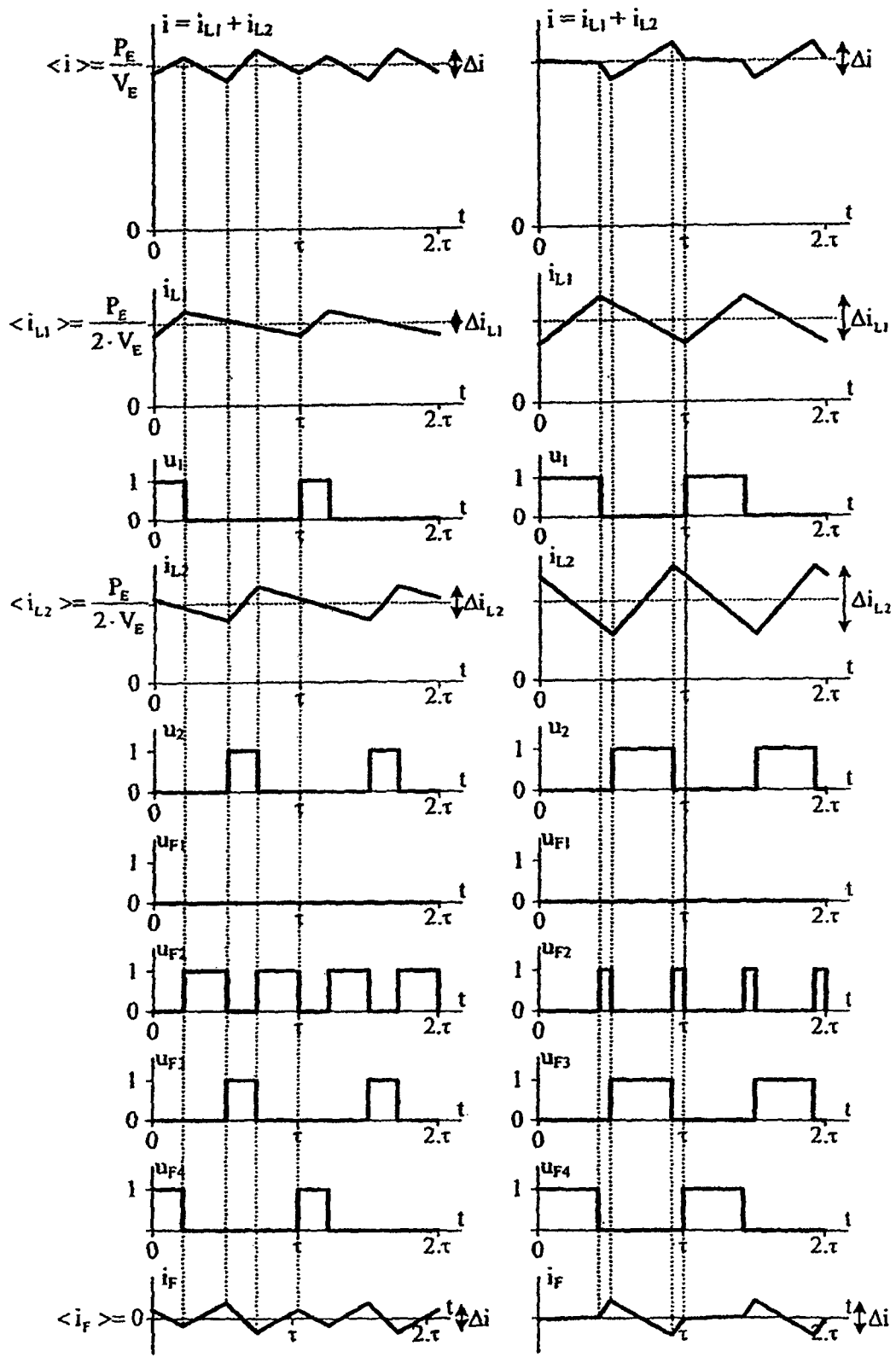
Figure 19A:
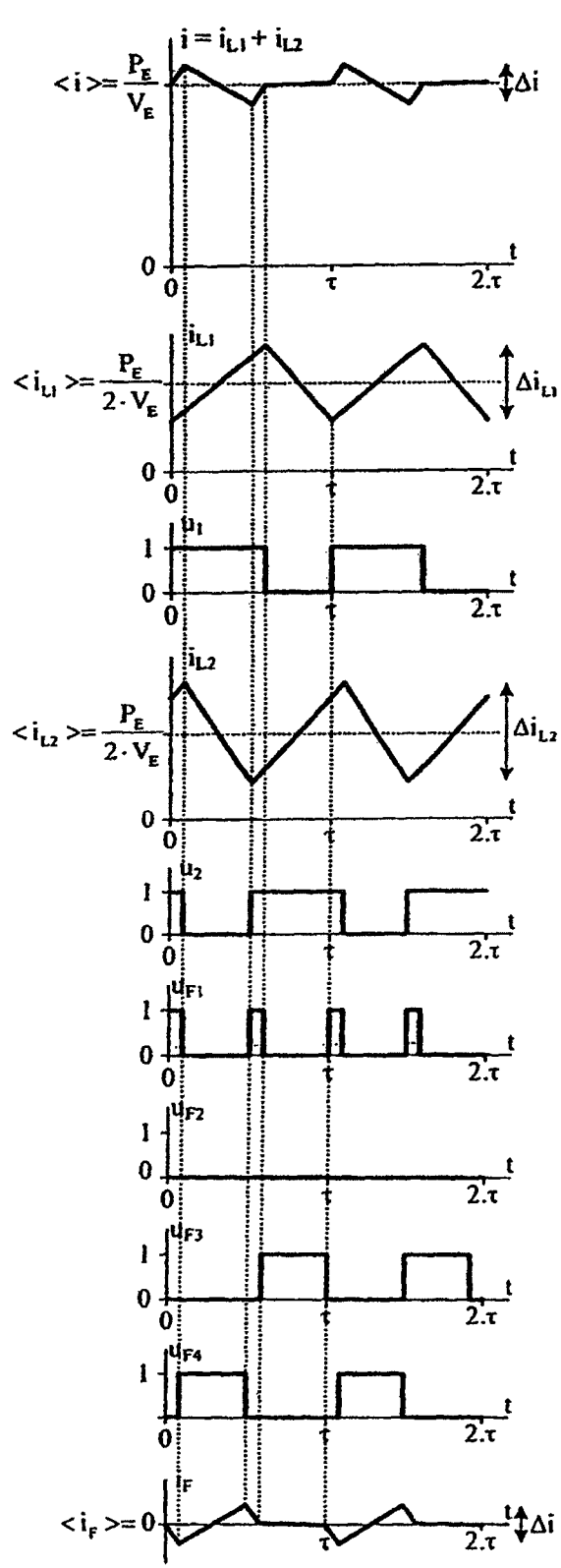
FIGS. 19*a* and 19*b* are timing diagrams of the signals and the filter control for a duty ratio d greater than 0.5, with $L_2<L_1$ and $d<L_1/(L_1+L_2)$ and $d>L_1/(L_1+L_2)$ respectively in FIG. 19*a* and in FIG. 19*b*.
Figure 19B:
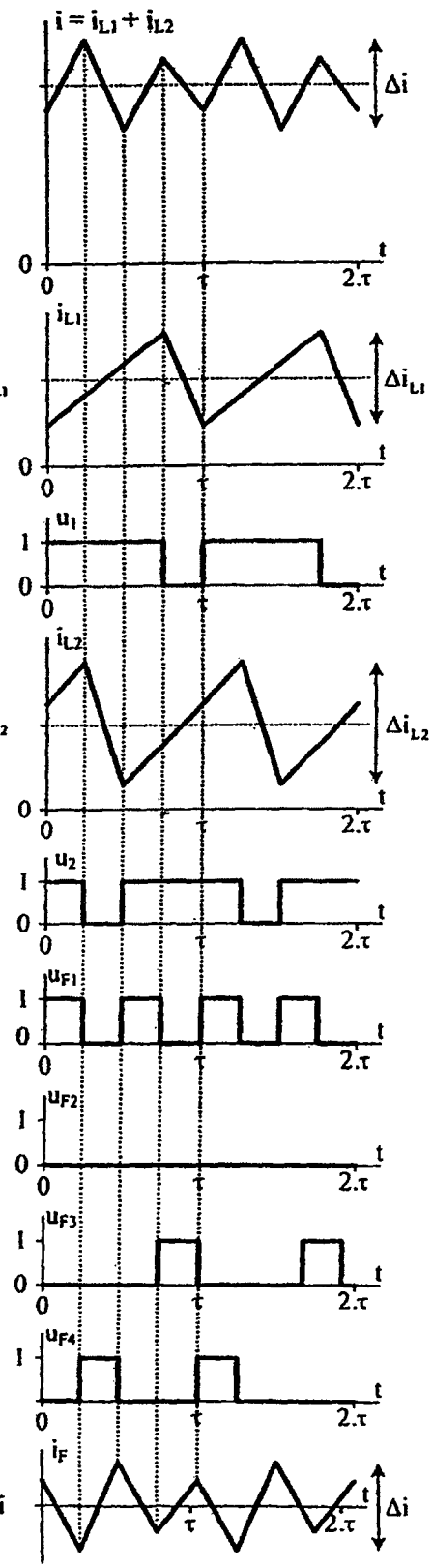

The waveforms and the controls of the switches differ depending on the value of the duty ratio (relative duration of conduction of a controlled switch in the load converters). The main difference in the controls arises depending on whether the duty ratio is less than 0.5 (FIG. 18) or greater than 0.5 (FIG. 19). In addition, the waveforms present differences depending on the value of the duty ratio relative to the following terms:

$$\frac{L_2}{L_1 + L_2} \text{ and } \frac{L_1}{L_1 + L_2}$$

Unlike the switches $T_{F1}, T_{F2},$ and $T_{F3}$, the switch $T_{F4}$ needs to be reversible in voltage and in current.

When the duty ratio is less than 0.5, only the switches $T_{F2}, T_{F3},$ and $T_{F4}$ are controlled. When the duty ratio is greater than 0.5, only the switches $T_{F1}, T_{F3},$ and $T_{F4}$ are controlled.

Figure 20A:
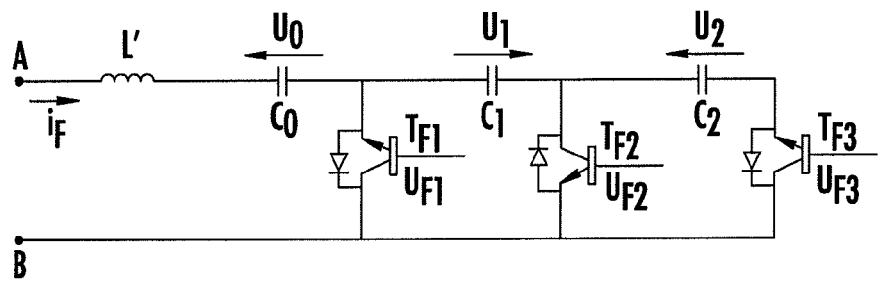
FIGS. 20*a* and 20*b* show variants of the active filter for n=2 when the inductors $L_1$ and $L_2$ have equal inductances.
Figure 20B:
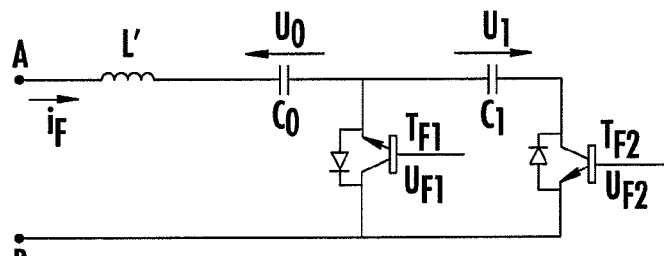

The circuit can be simplified if the inductances $L_1$ and $L_2$ are identical, since then the voltage $U_3$ given by above equation (3) is zero. It is then possible to eliminate the switch $T_{F4}$ and to arrive at the circuit of FIG. 20a. It is also possible to change the voltage control strategies so as to eliminate one of the capacitors and one of the switches so as to arrive at the circuit of FIG. 20b.

For n greater than 2, it is no longer advantageous to perform filtering by a single converter connected in parallel. Such a converter would require $2^n$ semiconductors and $2^n$ capacitors, whereas one individual active filter per branch would require the use of 2n semiconductors and 2n capacitors.

Figure 21:
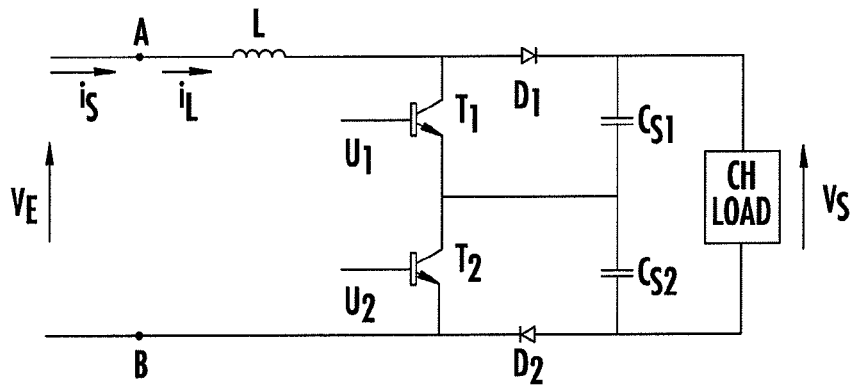
FIG. 21 that shows a load converter having two parallel output stages, FIGS. 22*a* and 22*b* showing how the switches are controlled depending on whether the duty ratio d is less than 0.5 (FIG. 22*a*) or greater than 0.5 (FIG. 22*b*)

The converters can also be connected in parallel beside the load in order to reduce the voltage that each switch needs to withstand. With a buck converter, it is generally two converters that are connected in parallel in order to reduce the voltage that each of the semiconductors needs to withstand (FIG. 21).

Figures 22A, 22B:
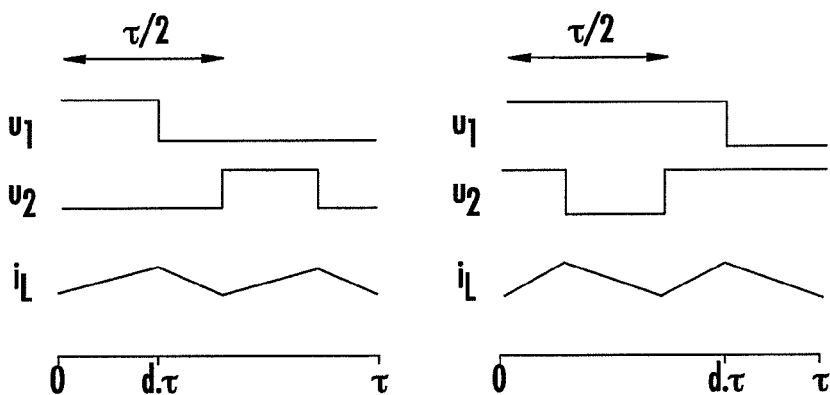

The voltage imposed across the terminals of the inductor L depends on the conduction pattern of the switches, and thus on the value of the duty ratio (FIG. 22).

Since there is only one inductor L in this circuit, the configuration of the filter device is as shown in FIG. 2 and the switch control pattern of the filter remains unchanged. It is the pattern shown in FIG. 6. In contrast, depending on the value of the duty ratio, the expressions for the voltages $U_0$ and $U_1$ given by equation (1) are modified.

If the duty ratio is less than 0.5, while $T_1$ or $T_2$ is conducting, then the voltage across the terminals of the inductor L is given by:

$$V_E - \frac{V_S}{2}$$

and when both switches are off, the voltage is equal to $V_E - V_S$. It follows that the voltages of the filter device are given by:

$$U_0 = \frac{L+L'}{L} \cdot V_E - \frac{L'}{L} \cdot \frac{V_S}{2} \quad (6)$$
$$U_1 = \frac{L'}{L} \cdot \frac{V_S}{2}$$

If the duty ratio is greater than 0.5, when $T_1$ and $T_2$ are conducting, then the voltage across the terminals of the inductor L is equal to $V_E$, and when $T_1$ or $T_2$ is conducting, it is equal to:

$$V_E - \frac{V_S}{2}$$

the voltages of the filter device then become:

$$U_0 = \frac{L+L'}{L} \cdot V_E \quad (7)$$
$$U_1 = \frac{L'}{L} \cdot \frac{V_S}{2}$$

EXAMPLE

The structure adopted for the power converter is a structure of the buck type (FIG. 2). The power structure was calibrated for a low current of 3 amps (A) and was designed to validate the principle of this active filtering.

Figure 23:
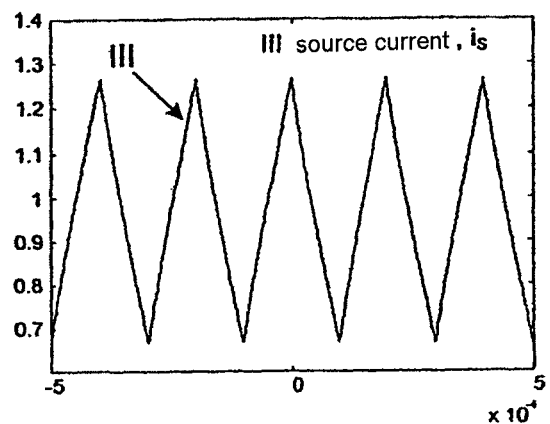
FIG. 23 shows experimental measurements of the current in the buck converter.

When only the buck converter was in operation, the current $i_S$ delivered by the source was as shown in FIG. 23. This figure shows the conventional current waveform at the input of a buck converter.

Figure 24:
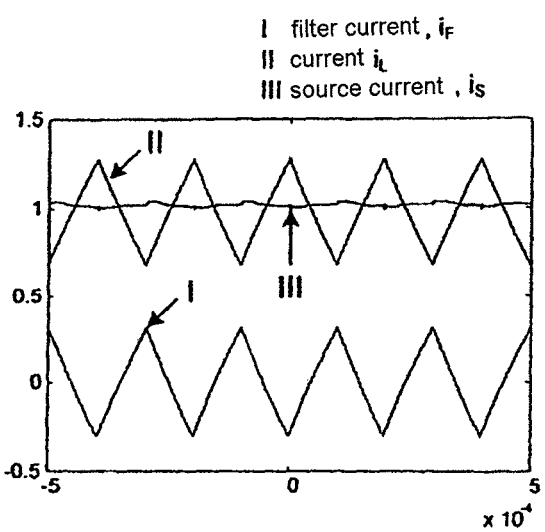
FIG. 24 shows experimental measurements of the current waveforms with the active filter in operation.

FIG. 24 shows the current $i_L$ of the buck converter and the current $i_F$ of the active converter (at the bottom). The current $i_S$ delivered by the source is practically constant. At these current and voltage levels, it is not desirable for the voltage drops at the terminals of the elements of the circuit to be ignored. It is therefore recommended to modify the voltages $U_0$ and $U_1$ as described above—equation (3) in order to take parasitic elements into account, possibly while ignoring some of them, as described above.

The invention claimed is:

1. An active filter device for a power supply comprising a source having a source current $i_S$ and a voltage $V_E$, a power converter presenting an input inductor L, a power switch T controlled by a chopper signal and delivering an output voltage $V_S$, and a load, wherein said active filter device includes an active filter converter (10) for generating at its output a compensation current at least of the harmonics of the source current due to the chopping, said active filter converter having switches which are controlled by a control signal, synchronous with said chopping signal; and wherein the active filter converter presents at least one filter module presenting in series from a first terminal (A) of the filter converter: an inductor L'; first and second capacitors ($C_0$ and $C_1$); and first and second switches ($T_{F1}$ and $T_{F2}$) that are controlled in opposition, which switches are connected respectively between first and second terminals (F and G) of the second capacitor, and a second terminal (B) of the filter converter; and also a DC-DC converter module ($AL_1$, $AL_2$) controlled at a chopper frequency to maintain the voltages ($U_0$, $U_1$) at the terminals of the first and second capacitors ($C_0$ and $C_1$) at their reference values.

2. A device according to claim 1, wherein the voltages $U_0$ and U, at the terminals of the first and second capacitors ($C_0$ and $C_1$) have the following values:

$U_0 = V_E(L+L')/L$ and $U_1 = V_S L'/L$.

3. A device according to claim 1, wherein the voltages $U_0$ and $U_1$ at the terminals of the first and second capacitors ($C_0$ and $C_1$) have the following values:

$$U_0 = U_{01} = V_E(L+L')/L - \frac{L'}{L}(R_L + R_K)i_L - (R_{C0} + R_{F1} + R_{L'})i_F$$
$$U_1 = U_{11} = (V_S + V_D)L'/L + (R_0 - R_K)\frac{L'}{L}i_L + (R_{C1} + R_{F2} - R_{F1})i_F$$

$R_L$ and $R_{L'}$ designating respectively the resistances of the inductor L and of the inductor L';
$R_K$ designating in the equivalent resistance of the power switch T;
$R_D$ and $V_D$ designating respectively the series resistance and the forward voltage drop of a power converter output diode D;
$R_{C0}$, $R_{C1}$, $R_{F1}$, and $R_{F2}$ designating the resistances respectively of the first and second capacitors $C_0$ and $C_1$ and of the switches $T_{F1}$ and $T_{F2}$.

4. A device according to claim 1, wherein the voltages $U_0$ and $U_1$ at the terminals of the first and second capacitors ($C_0$ and $C_1$) have the following values:

$U_0 = U_{01} - V_K L'/L - V_{F1}$, and $U_1 = U_{11} - V_K L'/L + V_{F2} - V_{F1}$ ; and $V_K$, $V_{F2}$, and $V_{F1}$ designating the voltage drops at the terminals of the switches T, $T_{F1}$, and $T_{F2}$.

5. A device according to claim 1, wherein the chopper frequency of the DC-DC converter module is greater than or equal to the frequency of the chopper signal of the power converter.

6. A device according to claim 1, wherein the DC-DC converter module presents two DC-DC converters ($AL_1$, $AL_2$).

7. A device according to claim 6, wherein the two DC-DC converters present a primary circuit having a bridge of power switches ($TT_{11}, \ldots, TT_{14}$), a transformer ($TR_1$), and a secondary circuit presenting a bridge of power switches ($TT_{21}, \ldots, TT_{24}$), the power switches ($TT_{11}$, $TT_{24}$) of said bridges being controlled in opposition in pairs.

8. A device according to claim 6, wherein the two DC-DC converters are non-reversible isolated choppers connected to the terminals respectively of the first and second capacitors ($C_0$ and $C_1$), and in that a resistor is connected to the terminals of each of the first and second capacitors ($C_0$ and $C_1$).

9. A device according to claim 1, wherein a DC-DC converter module presents a DC-DC converter with two outputs having a primary circuit presenting a bridge of power switches ($TT_{11}, \ldots, TT_{14}$), a transformer ($TR_2$) having two secondaries, and two secondary circuits, each presenting a respective bridge of power switches ($TT_{21}, \ldots, TT_{24}$) and ($TT_{25}, \ldots, TT_{28}$), the switches of the bridges of power switches ($TT_{11}, \ldots, TT_{28}$) being controlled in opposition in pairs.

10. An active filter device for a power supply comprising a source having a source current $i_S$ and a voltage $V_E$, a power converter presenting an input inductor L, a power switch T controlled by a chopper signal and delivering an output voltage $V_S$, and a load, wherein said active filter device includes an active filter converter (10) for generating at its output a compensation current at least of the harmonics of the source current due to the chopping, said active filter converter having switches which are controlled by a control signal, synchronous with said chopping signal; wherein the power converter (CONV) presents at least two power conversion stages connected in parallel; wherein the power conversion stages are controlled in interlaced manner with a controlled time offset, e.g. of $\tau/n$, where n designates the number of parallel power conversion stages and $\tau$ designates the chopping period of the power converter; and wherein the active filter converter comprises n active filter modules in series, each of which is controlled synchronously with a power conversion stage.

11. An active filter device for a power supply comprising a source having a source current $i_S$ and a voltage $V_E$, a power converter presenting an input inductor L, a power switch T controlled by a chopper signal and delivering an output voltage $V_S$, and a load, wherein said active filter device includes an active filter converter (10) for generating at its output a compensation current at least of the harmonics of the source current due to the chopping, said active filter converter having switches which are controlled by a control signal, synchronous with said chopping signal; wherein the power converter (CONV) presents at least two power conversion stages connected in parallel; wherein the power conversion stages are controlled in interlaced manner with a controlled time offset, e.g. of E/n, where n designates the number of parallel power conversion stages and $\tau$ designates the chopping period of the power converter; and wherein the active filter converter comprises n active filter modules in parallel, each of which is controlled synchronously with a power conversion stage.

* * * * *

UNITED STATES PATENT AND TRADEMARK OFFICE
CERTIFICATE OF CORRECTION

PATENT NO. : 8,742,734 B2
APPLICATION NO. : 12/530698
DATED : June 3, 2014
INVENTOR(S) : Martin et al.

It is certified that error appears in the above-identified patent and that said Letters Patent is hereby corrected as shown below:

On the Title page,
Item (73) Assignees: "Scientifque" should read --Scientifique--.

In the claims:

Column 12,
Line 19, "U" should read --$U_1$--;
Line 64, "($TT_{11}$, $TT_{24}$)" should read --$TT_{11}$, ..., $TT_{24}$)--.

Column 14,
Line 19, "E/n" should read --$\tau/n$--.

Signed and Sealed this
Sixteenth Day of September, 2014

Michelle K. Lee
*Deputy Director of the United States Patent and Trademark Office*